(12) United States Patent
Stretton

(10) Patent No.: US 10,539,095 B2
(45) Date of Patent: Jan. 21, 2020

(54) AIRCRAFT GAS TURBINE ENGINE NACELLE

(71) Applicant: ROLLS-ROYCE plc, London (GB)

(72) Inventor: Richard G. Stretton, Ashby-de-la-Zouch (GB)

(73) Assignee: ROLLS-ROYCE plc, London (GB)

( * ) Notice: Subject to any disclaimer, the term of this patent is extended or adjusted under 35 U.S.C. 154(b) by 339 days.

(21) Appl. No.: 15/459,724

(22) Filed: Mar. 15, 2017

(65) Prior Publication Data
US 2017/0292473 A1 Oct. 12, 2017

(30) Foreign Application Priority Data

Apr. 6, 2016 (GB) .................................... 1605863.8

(51) Int. Cl.
*F02K 1/72* (2006.01)
*F02K 1/76* (2006.01)
(Continued)

(52) U.S. Cl.
CPC ............... *F02K 1/72* (2013.01); *F02K 1/563* (2013.01); *F02K 1/64* (2013.01); *F02K 1/763* (2013.01); *F02K 1/766* (2013.01); *F02K 3/06* (2013.01); *F04D 29/522* (2013.01); *F04D 29/542* (2013.01); *F04D 29/563* (2013.01);
(Continued)

(58) Field of Classification Search
CPC .... F04D 29/522; F04D 29/542; F04D 29/563; F02K 1/64; F02K 1/72; F02K 1/763; F02K 1/766; F02K 1/563; F02K 3/06
See application file for complete search history.

(56) References Cited

U.S. PATENT DOCUMENTS 3,040,524 A * 6/1962 Kurti .......................... F02K 1/64
60/226.2
3,747,341 A * 7/1973 Davis ........................ F02K 1/66
239/265.31

(Continued)

FOREIGN PATENT DOCUMENTS

| EP | 2 484 591 A2 | 8/2012 |
| FR | 3 014 146 A1 | 6/2015 |
| WO | 2011/154644 A1 | 12/2011 |

OTHER PUBLICATIONS

Aug. 24, 2016 Search Report issued in British Patent Application No. 1605863.8.

(Continued)

*Primary Examiner* — Brian P Wolcott
(74) *Attorney, Agent, or Firm* — Oliff PLC

(57) ABSTRACT

An aircraft gas turbine engine nacelle comprises a thrust reversal arrangement. The thrust reversal arrangement comprises at least first and second circumferentially spaced fixed thrust reverser cascade boxes each comprising a plurality of thrust reverser vanes configured to direct air forwardly and circumferentially and at least one inter-leaved translating circumferential turning vane configured to direct air in a direction having a circumferential component. The circumferential turning vane is moveable from a stowed position provided between the first and second circumferentially spaced thrust reverser cascade boxes, and a deployed position axially rearwardly of the thrust reverser cascade boxes.

12 Claims, 4 Drawing Sheets

(51) Int. Cl.
    *F02K 1/64* (2006.01)
    *F02K 1/56* (2006.01)
    *F02K 3/06* (2006.01)
    *F04D 29/52* (2006.01)
    *F04D 29/54* (2006.01)
    *F04D 29/56* (2006.01)

(52) U.S. Cl.
    CPC .... *F05D 2220/323* (2013.01); *F05D 2250/37* (2013.01); *F05D 2260/30* (2013.01)

(56) References Cited

U.S. PATENT DOCUMENTS

| | | | |
|---|---|---|---|
| 5,507,143 A * | 4/1996 | Luttgeharm | F02K 1/563 |
| | | | 239/265.31 |
| 6,256,980 B1 * | 7/2001 | Lecordix | F02K 1/72 |
| | | | 239/265.29 |
| 6,434,927 B1 * | 8/2002 | Stretton | F02K 1/72 |
| | | | 239/265.31 |
| 9,133,790 B2 * | 9/2015 | Pitiot | F02K 1/70 |
| 9,212,624 B2 * | 12/2015 | Aten | F02K 1/72 |
| 10,113,507 B2 * | 10/2018 | Starovic | F02K 1/72 |
| 2013/0025260 A1 | 1/2013 | Pitiot et al. | |
| 2015/0285185 A1 | 10/2015 | Caruel | |
| 2016/0047333 A1 | 2/2016 | Starovic et al. | |

OTHER PUBLICATIONS

Aug. 11, 2017 Search Report issued in European Patent Application No. 17 16 1031.

* cited by examiner

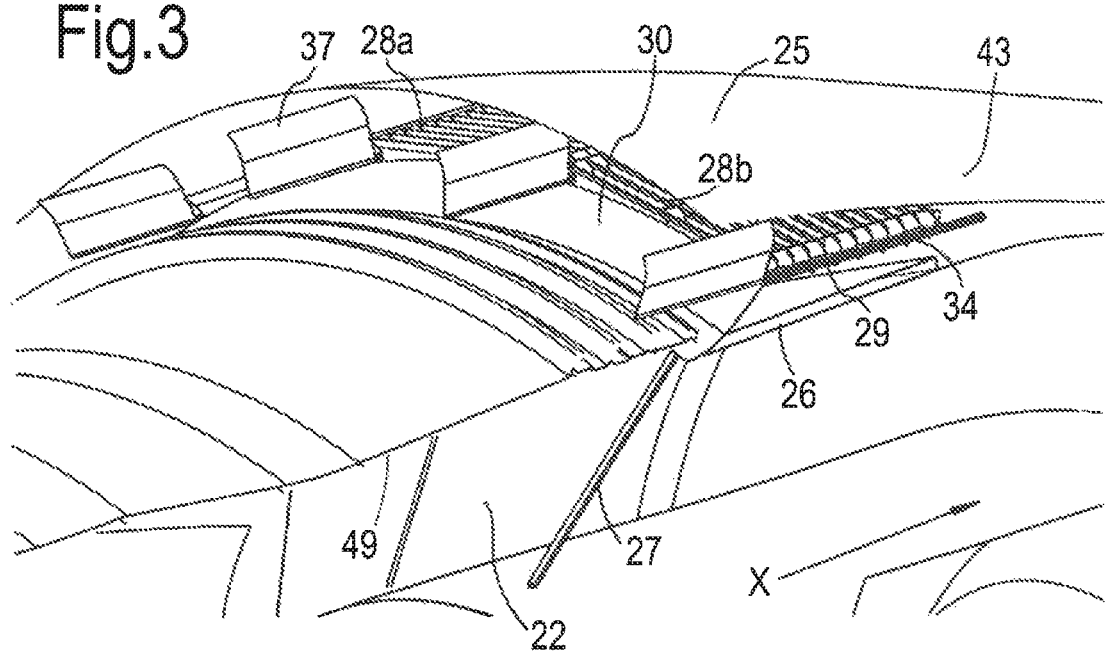
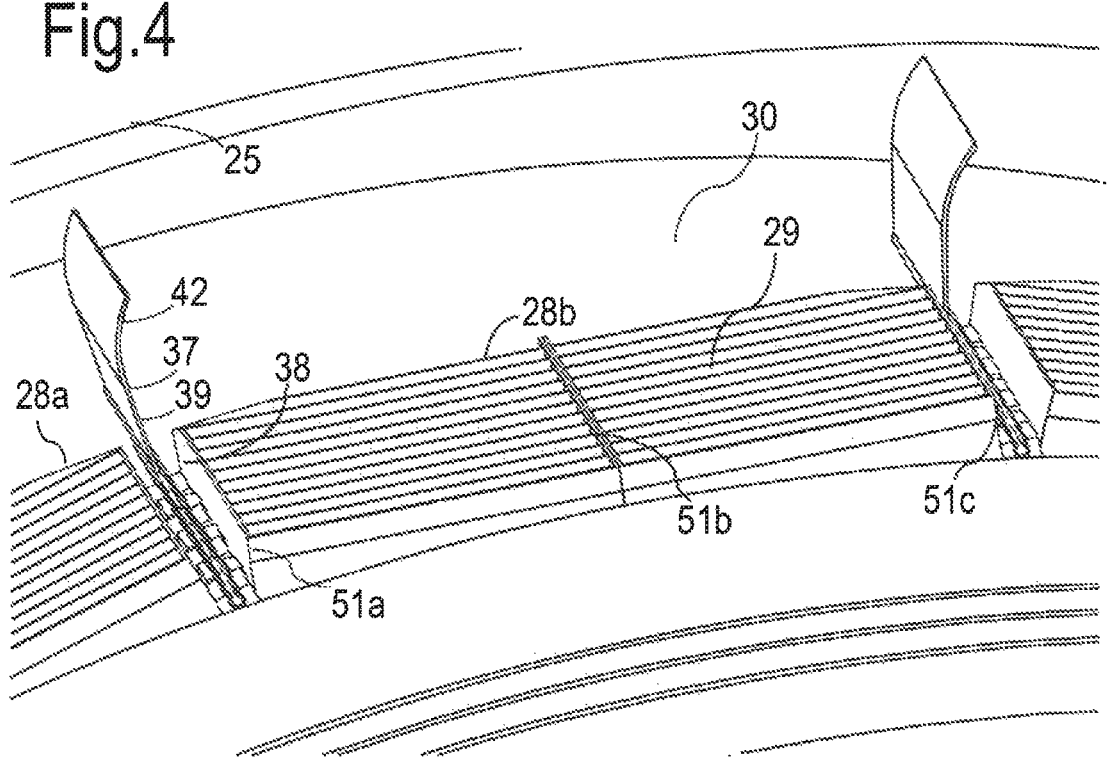

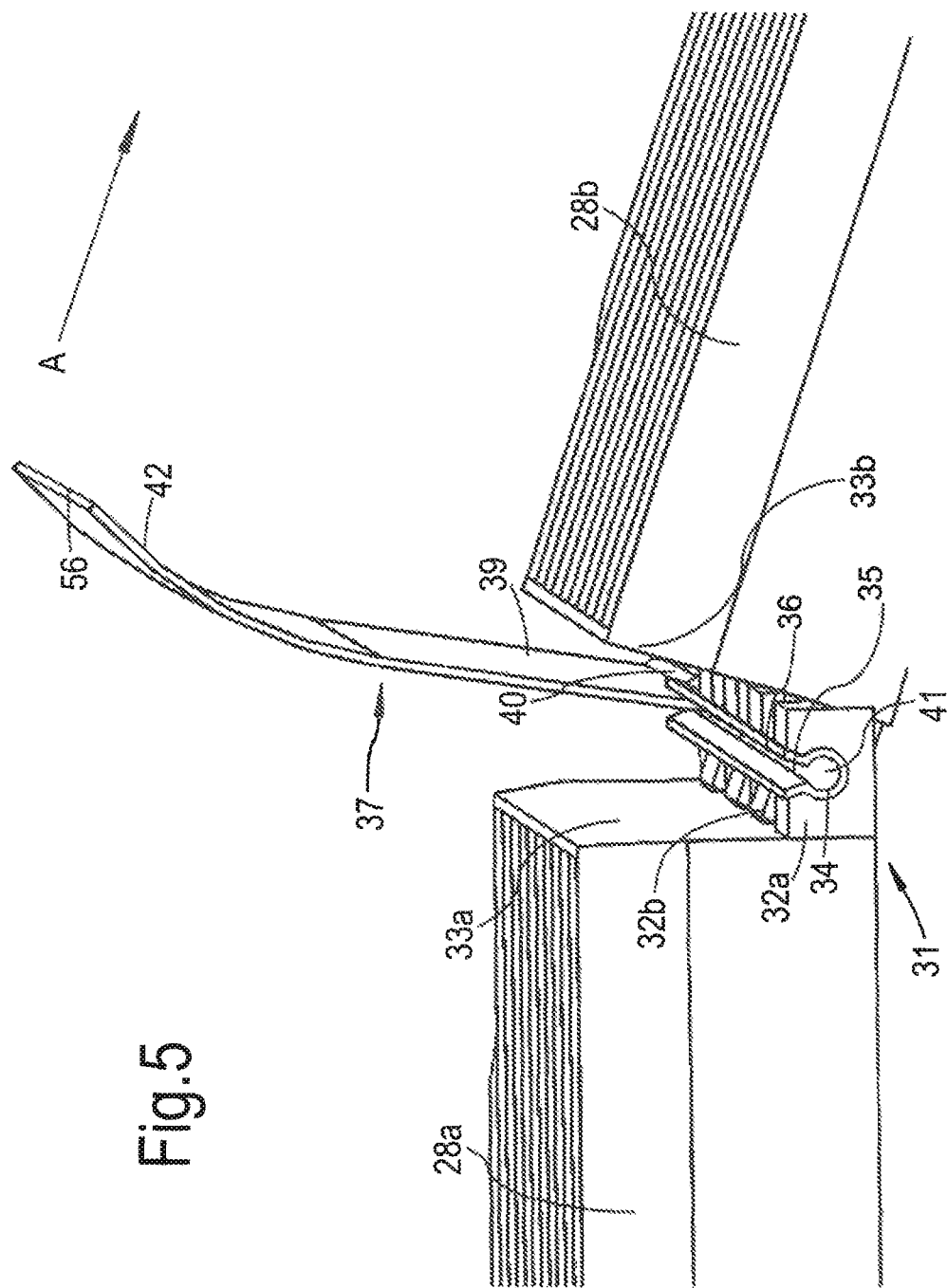

AIRCRAFT GAS TURBINE ENGINE NACELLE

TECHNICAL FIELD

The present disclosure concerns a nacelle for an aircraft gas turbine engine, and in particular, to a nacelle comprising a thrust reverser.

BACKGROUND

Aircraft gas turbine engines typically comprise thrust reversers configured to provide a thrust component having a reverse flow direction compared to normal flow in forward flight, or to at least provide additional drag, in order to reduce the speed of the aircraft. One known arrangement comprises a "cold stream" thrust reverser, in which blocker doors are deployed to prevent normal flow through the bypass duct rearwardly of the fan, while permitting flow through the engine core. Simultaneously, a sleeve around the perimeter of the nacelle moves axially rearwards, revealing vanes, which redirect bypass air forward, thereby providing reverse thrust. The vanes are typically configured in discrete cascade boxes, with each cascade box typically having an individual arrangement of forward turning vanes.

However, such arrangements require the provision of vanes over a significant length of the nacelle. The vanes have a relatively large radial thickness, which may increase the overall thickness of the nacelle, and so increase aerodynamic drag in normal flight. Consequently, there is a need to provide an aircraft gas turbine engine nacelle which overcomes or ameliorates the above problems.

Furthermore, in conventional arrangements, the thrust reverser cascade boxes are attached individually to the nacelle thrust reverser unit, with the cascade boxes typically located by attaching bolts along the forward edge of a cascade box to the nacelle frame, and at the rear edge of the cascade box to a large structural aft cascade ring. With this arrangement, the aft support ring for the cascade array forms a key hardpoint defining the nacelle aero surface which can lead to an increased length and diameter nacelle.

SUMMARY

According to a first aspect of the invention there is provided an aircraft gas turbine engine nacelle comprising a thrust reversal arrangement, the thrust reversal arrangement comprising:
at least first and second circumferentially spaced fixed thrust reverser cascade boxes, each comprising a plurality of thrust reverser vanes configured to direct air forwardly;
at least one circumferential turning vane configured to direct air in a direction having a circumferential component;
the circumferential turning vane being moveable from a stowed position provided between the first and second circumferentially spaced thrust reverser cascade boxes, and a deployed position axially rearwardly of the thrust reverser cascade boxes.

It has been found by the inventors that, in certain circumstances, there is insufficient radial depth within the nacelle to accommodate thrust reverser cascade boxes of sufficient axial extent to accommodate the necessary fan mass flow during reverse thrust operation. Consequently, a gap may exist downstream of the thrust reverser cascade boxes. During operation, air exiting the gap will generally be directed radially by the blocker doors, which may in turn strike the ground, wings, engine pylon or other equipment, thereby throwing up debris or causing flow distortion around the engine. The present invention solves this problem by providing circumferentially turning vanes which are stowed between the thrust reverser cascades when in the stowed position, and are located in the gap downstream of the thrust reverser cascades when in the deployed position. Consequently, air exhausted through the gap can be redirected in a circumferential direction at these locations, thereby permitting a nacelle having a low radial profile, while preventing radial flow in undesirable locations.

At least one circumferential turning vane may be provided at or near a lower portion of the nacelle. Advantageously, air that would normally strike the ground, and thereby kick up debris, is redirected circumferentially. At least one circumferential turning vane may be provided at or near an upper portion of the nacelle. Advantageously, air that would normally strike the wings and/or engine pylons is redirected away.

The thrust reversal arrangement may comprise one or more blocker doors configured to be moveable between a stowed and a deployed position by a blocker door actuator.

The gas turbine engine nacelle may comprise an axially movable aft cowl moveable between a forward stowed position and a rearward deployed position. Each circumferential turning vane may be mounted to the aft cowl such that the circumferential turning vane and aft cowl move together when moving between the deployed and stowed positions.

The thrust reversal arrangement may comprise a first circumferential turning vane provided at a first location and a second circumferential turning vane provided at a second location, the first circumferential turning vane being configured to direct air in a first circumferential direction and the second circumferential turning vane being configured to direct air in a second circumferential direction, such that, in use, roll torque force forces generated by the first and second vanes substantially cancel one another.

The or each circumferential turning vane may be mounted to adjacent thrust reverser cascade boxes by a pin slidably mounted to an axially extending rail. The axially extending rail may be located between the first and second thrust reverser cascade boxes. The first and second thrust reverser cascade boxes may each comprise one or more hooks which extend part way around the rail when installed. Advantageously, disassembly of the thrust reverser assembly for access to nacelle components or for maintenance is improved relative to existing arrangements.

At least one cascade box may be mounted to one or more of a reverse actuator, an upper hinge beam, and a lower latch beam.

According to a second aspect of the invention there is provided an aircraft comprising a gas turbine engine having a nacelle in accordance with the first aspect of the invention.

The skilled person will appreciate that except where mutually exclusive, a feature described in relation to any one of the above aspects of the invention may be applied mutatis mutandis to any other aspect of the invention.

BRIEF DESCRIPTION OF THE DRAWINGS

An embodiment of the invention will now be described by way of example only, with reference to the Figures, in which:

FIG. 3 a perspective cross sectional view of the aircraft gas turbine engine nacelle of FIG. 2, showing the thrust reverser arrangement in a stowed position;

FIG. 4 is a perspective top view from a forward end of part of the thrust reverser arrangement of FIG. 2 in the deployed position;

FIG. 5 is a perspective view from a forward end of part of the thrust reverser of FIG. 2 in the deployed position;

DETAILED DESCRIPTION

Figure 1:
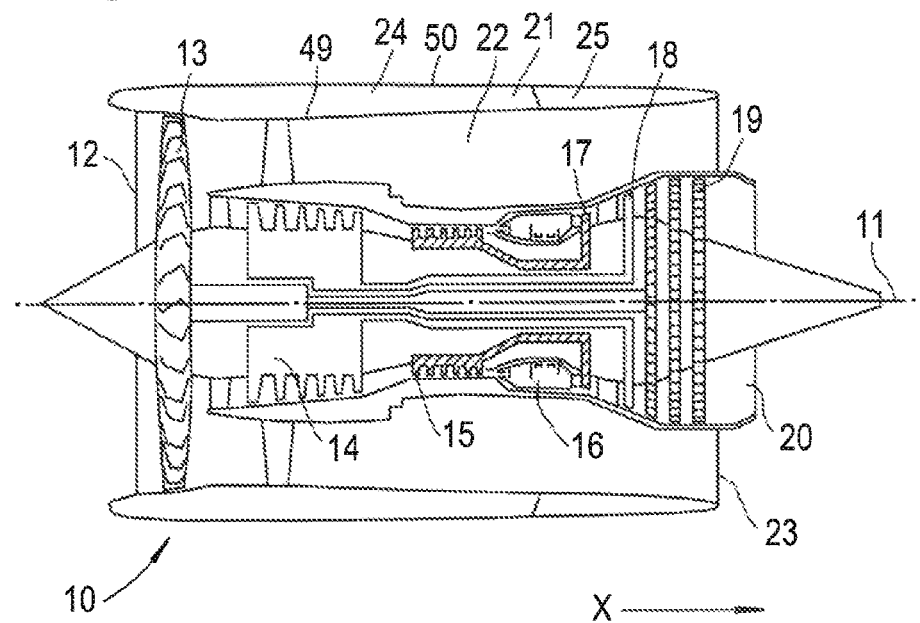
FIG. 1 is a sectional side view of a gas turbine engine.

With reference to the figures, a gas turbine engine having a thrust reversal arrangement is generally indicated at 10. As shown in FIG. 1, the engine 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core exhaust nozzle 20. A nacelle 21 generally surrounds the engine 10 and defines both the intake 12 and the fan exhaust nozzle 23 and also defines a hot core stream outlet 20 at an aft end thereof. The rear part of the nacelle 21 incorporates a thrust reverser arrangement within the aft part of the nacelle 25.

The gas turbine engine 10 works in the conventional manner so that air entering the intake 12 is accelerated by the fan 13 to produce two air flows: a first air flow A into the intermediate pressure compressor 14 and a second air flow B which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
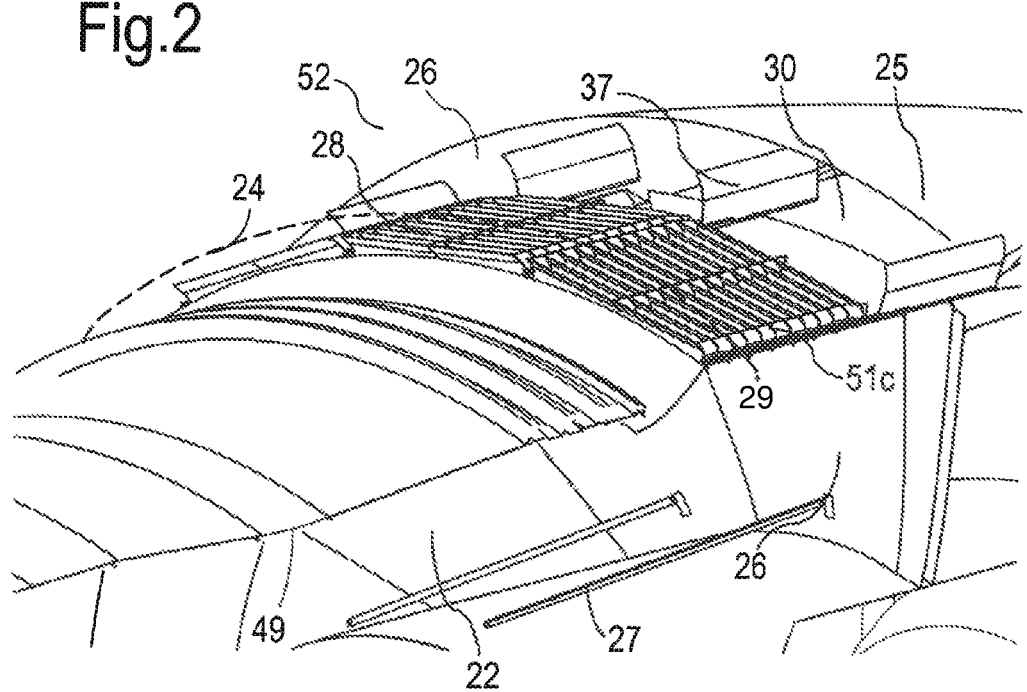
FIG. 2 is a perspective cross sectional view of an aircraft gas turbine engine nacelle showing a thrust reverser arrangement in a deployed position.

In normal forward flight, the engine 10 is configured such that exhaust flows from the fan 13 and engine core nozzle 20 are directed in first axial direction X, shown in FIGS. 1 and 2. The direction X also defines a rearward direction.

Referring to FIG. 2, the nacelle 21 comprises a thrust reverser arrangement, which is configured to block normal flow in the direction X through the primary outlet 23, and provide airflow having an axially forward component (i.e. having a component in an opposite direction to the first axial direction X) when actuated.

The arrangement comprises a forward cowl 24, which is fixed. The forward cowl 24 comprises a radially inner wall 49 and a radially outer wall 50, defining an annular gap 52 therebetween. Rearwardly of the forward cowl 24 is an aft cowl 25 (also known as a "transcowl"), which is axially moveable relative to the forward cowl 24 between a forward, stowed position (as shown in FIGS. 1 and 3) and a rearward, deployed position (as shown in FIGS. 2, 4 and 5).

When in the stowed position, the forward and aft cowls 24, 25 abut one another, such that air flows through the bypass duct 22 and out through the primary outlet 23. When deployed, the aft cowl 25 is moved rearwardly, such that an annular gap 52 is opened in the nacelle 21 between the forward and aft cowls 24, 25. Simultaneously, blockers doors 26 are moved into a deployed position (again shown in FIGS. 2, 4 and 5), such that the primary outlet 23 is blocked. Drag links 27 attached to the blocker doors 26 support the blocker doors when in position. Consequently, airflow is caused to flow out the annular gap 52 between the forward 24 and aft 25 cowls.

At least first and second fixed circumferentially arranged thrust reverser cascade boxes 28a, 28b are provided such that the thrust reverser cascade boxes 28a, 28b are located in the gap 52 when the aft cowl 25 and blocker doors 26 are deployed. The thrust reverser cascade boxes 28a, 28b are shown in more detail in FIGS. 4 and 5. Each thrust reverser cascade box 28a, 28b comprises a plurality of thrust reverser vanes 29, which are configured to direct air exiting through the cascades 28a, 28b in a radially outward and axially forward direction, i.e. in a direction having a forward component, opposite to the direction X. Each thrust reverser vane 29 extends in a generally circumferential direction and in a radial direction, and turns from a generally radial direction at a radially inner end to a generally axially forwardly direction at a radially outer end, such that air exiting through the gap 52 is turned forwardly.

Each thrust reverser cascade box 28a, 28b further comprises at least one radially turning vane 51. Each radially turning vane 51 extends in a generally axial direction and in a generally radial direction, such that air at these locations is directed generally radially. First, second and third radial turning vanes 51a, 51b, 51c are provided at circumferential ends (51a, 51c) and at an intermediate location (51b). These vanes additionally provide reinforcement of the cascade boxes 28. Consequently, the cascade boxes 28 provide reverse thrust when the aft cowl 25 is deployed.

The cascade boxes 28a, 28b are mounted at a forward end to the forward cowl inner wall 49. The cascade boxes 28a, 28b are also mounted to one another by a mounting arrangement 31 shown in detail in FIG. 5. Each of the cascade boxes 28a, 28b comprises a hook 32a, 32b projecting from a radially inner end of opposing circumferential ends 33a, 33b of the respective adjacent cascade boxes 28a, 28b. Each hook 32a, 32b comprises a part circular opening, having a radially outward facing open end, and the hooks 32a, 32b are arranged alternately from each box 28a, 28b in an axial direction. A guide rail 34 is provided within the opening of each hook 32a, 32b, and again extends in the axial direction X. Consequently, the cascade boxes 28a, 28b are constrained from moving relative to one another by the hooks and guide rail 34.

The guide rail 34 comprises a hollow part circular profile member, and extends axially through each of the hooks 32a, 32b. The guide rail 34 defines a radially outward facing open end 35 and a flange 36. An axially extending radially outwardly open channel 41 is thereby provided within the guide rail 34.

The thrust reverser cascade boxes 28 have an axial extent which only partly covers the annular gap 52 between the forward nacelle 24 and a deployed aft cowl 25. Consequently, a portion 30 of the gap 52 is left open, through which air can flow when the aft cowl 25 is deployed. Circumferentially turning vanes 37 are provided within the portion 30 of the gap 26 when the aft cowl 25 is in the deployed position, and are mounted to the aft cowl 25.

Referring to FIG. 4, the vanes 37 are provided at a circumferential position corresponding to an axially and part circumferentially extending inter-cascade gap 38 defined by the circumferential ends 33a, 33b of adjacent thrust reverser cascades 28a, 28b, and so the vanes 37 are provided between circumferentially spaced adjacent thrust reverser cascades 28a, 28b. Each vane 37 comprises a substantially radially extending radially inner portion 39 extending from a guide pin 40. The guide pin 40 extends axially within the axially extending channel 41, and is arranged to be slidably moveable within the channel 41. Consequently, the vanes 37 are radially and tangentially constrained by the guide rail 34. The vane 37 is prevented from rotating by the flange 36. The vane 37 comprises a radially outer portion 42 which extends from the radially inner portion 39. The radially outer portion 42 extends radially outwardly, and projects circumferentially, i.e. at an angle to a radial plane in a first circumferential direction A.

Each vane 37 is fixedly mounted to the aft cowl 25 at a radially outer end 56 of the radially outer portion 42. Alternatively or in addition, the vanes 37 may be hingedly mounted to a radially outer portion of the blacker doors 26, or any other equipment connected to the thrust reverser actuators 55 (shown in FIG. 6), such that the vanes 37 move with the aft cowl when the aft cowl 25 is moved between the stowed and deployed positions. As shown in FIG. 3, when in the stowed position, at least part of the vanes 37 are located axially forwardly of the thrust reverser cascades 28a, 28b, since the vanes 37 extend at least partly forwardly of the aft cowl 25. Consequently, when in the stowed position, the vanes 37 are stowed within a relatively thick area of the nacelle 21, radially inwardly of the forward cowl 24. Consequently, the aft cowl 25 may have a relatively narrow profile in the region 43 aft of the thrust reverser cascade boxes 28a, 28b, since no thrust reversal equipment is stowed in this region. Meanwhile, the vanes 37 can be easily accommodated in the space available within the forward cowl 24.

On deployment, the vanes 37 are drawn axially rearwardly by the movement of the aft cowl 25, thereby moving axially rearwardly through the inter-cascade gap 38, and in to the portion 30 of the annular gap which is not occupied by the thrust reverser cascade boxes 28a, 28b. Consequently, air that flows through this region in operation is redirected in a direction having a circumferential component (i.e. at an angle to a radial direction, in a plane normal to the engine longitudinal axis 11, i.e. in a spiral when viewed from the front or rear of the engine 10). Consequently, at least at some positions, air is directed away from areas where impingement would have negative consequences.

Figure 6:
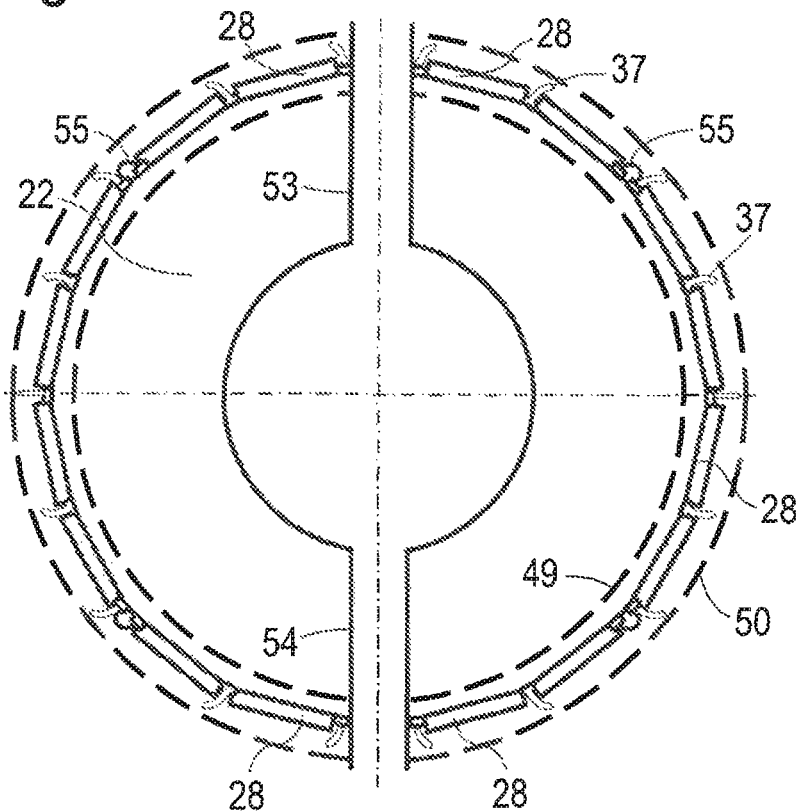
FIG. 6 is a schematic cross sectional view of the gas turbine engine nacelle of FIG. 2 from a forward end.

FIG. 6 shows a schematic cross sectional view of the nacelle 21 from a forward end. The nacelle 21 is divided into port and starboard halves by a "c-duct" arrangement, comprising radial extending vertical (relative to when the aircraft is in level flight, or located on the ground) upper hinge beam 53 and low latch beam 54. Each side comprises actuators 55 (typically two or three) which act on the circumferentially turning vanes 37, blockers doors 26 and aft cowl 25 to move them between the stowed and deployed positions. As can be seen, a subset of the cascade boxes 28 are mounted one of the upper and lower radially extending beams 54, 54, thereby holding the cascade boxes 28 in position relative to the fixed portions of the engine 10.

Figure 7:
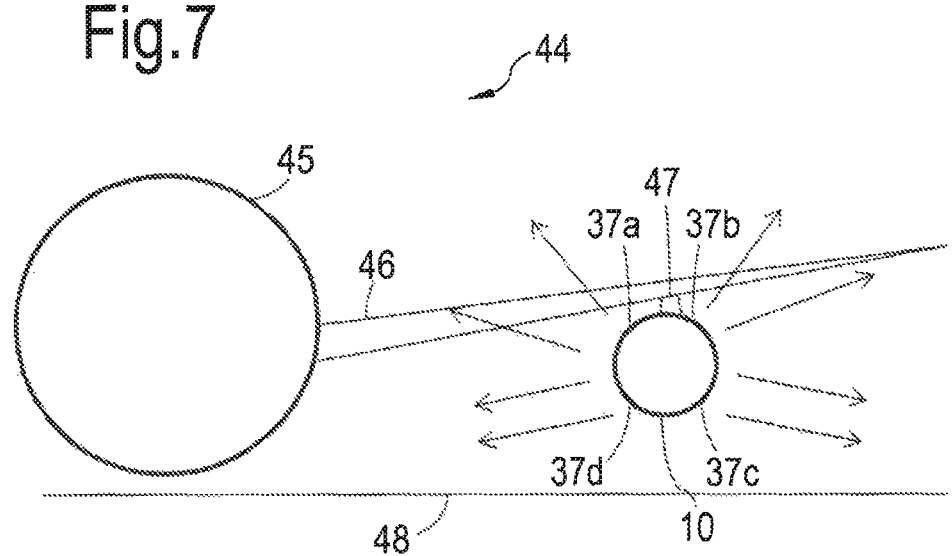
FIG. 7 is a schematic cross sectional view from a forward end of an aircraft having the gas turbine engine having the nacelle of FIG. 2.

FIG. 7 shows a frontal schematic cross sectional view through an aircraft 44 having an engine 10 having a thrust reverser arrangement of FIGS. 1 to 6 installed thereon. The aircraft comprises a fuselage 45 and a pair of wings 46 on which a pair of engines 10 are mounted via pylons 47. The circumferential turning vanes 37 are provided at various circumferential positions around the engine longitudinal axis 11. FIG. 6 shows an example of locations where vanes 37 may be employed. A first vane 37a is provided at approximately 11 o'clock position (with 12 o'clock being the top dead centre of the engine when the aircraft is on level ground), with a corresponding second circumferential turning vane 37b being provided at approximately 1 o'clock position. Similarly, third and fourth vanes 37c, 37d are provided at the 5 o'clock and 7 o'clock positions respectively, and are configured to redirect air away from the ground 48. Additional translating circumferential turning vanes would be provisioned in-between the upper 37a, 37b and lower 37c, 37d vanes, and inter-leaved with the cascade boxes 28. Typically there would be 8-12 translating circumferential turning vanes 37 per reverser half, positioned at the natural breaks between the cascade boxes. The number of vanes per side would be linked to the number of cascade boxes 28. The translating circumferential turning vanes could be interchangeable, to provision different amounts of circumferential turning for tuning of the efflux pattern during development. The translating circumferential turning vanes would work in conjunction with the fixed cascade boxes 28 and be used to fine-tune the efflux to help limit impingement of the reverser exhaust gases on aircraft surfaces (e.g. leading edge slats, wing or fuselage) and minimise re-ingestion of the exhaust flow into the engine 10. It is envisaged that vanes 37 in each reverser half would be configured to provide both clockwise and anti-clockwise turning per reverser half in order to balance aero loads fed into the aft nacelle cowl 25.

Consequently, the invention provides a thrust reverser assembly which is compact, allowing engine nacelles having relatively thin cross sections at their aft end, and relatively short axial extents, thereby improving aerodynamics. It has been found by the inventors that adequate thrust reversal can be provided without redirecting all of the fan flow forwardly. Meanwhile, the design avoids high velocity airflow from impinging on sensitive structures, while accommodating all fan flow from the bypass duct 22. The attachment of the cascade boxes to one another provide effective distribution of the hoop load imposed on the thrust reverser cascades in use. Consequently, the aft cascade ring normally used for this purpose can be omitted, leading to reduce axial length of the thrust reverser assembly.

The invention also provides a reliable, lightweight means for mounting the thrust reverser cascades to one another, while permitting easy access for removal and reinstallation. Due to the staking of the circumferential turning vanes 31 and thrust reverser cascades 28, the circumferential turning vanes can have a relatively large radial extent, thereby increasing their effectiveness. Additionally, inter-leaving the translating vanes between the cascade boxes, allows a more radially compact installation compared to prior installations.

The cascades 28a, 28b can be removed as follows, Firstly, the rear cowl 25 is moved to the deployed position as shown in FIG. 2. Secondly, the cascades 28a, 28b are disconnected from the forward cowl inner wall 49 by disconnecting fasteners. Thirdly, the guide rails 34 are slid out forwardly, thereby unhooking the cascades 28a, 28b from guide rail 34. Alternatively, the vanes 37 could be slid forward, and the flanges 36 of the guide rail pressed together to release the guide rails from the hooks 32a, 32b. The cascades 28a, 28b can then be removed as appropriate from the forward cowl 24, by pulling the cascades 28a, 28b forward. Consequently, the cascades 28a, 28b easily be removed and interchanged to permit efflux tailoring during development.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the invention could be applied to engines having two shafts, or to lower bypass ratio engines. The engines could me mounted underwing, as shown in FIG. 7, or mounted to the rear fuselage for example.

The invention claimed is:

1. An aircraft gas turbine engine nacelle comprising:
    a thrust reversal arrangement including:
        at least one first circumferentially spaced fixed thrust reverser cascade box and at least one second circumferentially spaced fixed thrust reverser cascade box, each of the first and second circumferentially spaced fixed thrust reverser cascade boxes including a plurality of thrust reverser vanes configured to direct air forward in an axial direction of a gas turbine engine; and
        at least one circumferential turning vane configured to direct air in a direction having at least a circumferential component, the at least one circumferential turning vane being moveable between (i) a stowed position provided between or forward of the at least first and the at least second circumferentially spaced fixed thrust reverser cascade boxes, and (ii) a deployed position located axially rearward of the at least first and the at least second circumferentially spaced fixed thrust reverser cascade boxes, wherein:
        in the deployed position, an annular gap exists in the axial direction between the at least first and the at least second circumferentially spaced fixed thrust reverser cascade boxes and an axially forward edge of an aft cowling, and
        the at least one circumferential turning vane moves with the aft cowling through an inter-cascade gap and into the annular gap when in the deployed position to be located axially rearward of the at least first and the at least second circumferentially spaced fixed thrust reverser cascade boxes.

2. The nacelle according to claim 1, wherein the at least one circumferential turning vane is provided at a lower portion of the nacelle.

3. The nacelle according to claim 1, wherein the at least one circumferential turning vane is provided at an upper portion of the nacelle.

4. The nacelle according to claim 1, wherein the thrust reversal arrangement includes at least one blocker door configured to be moveable between the stowed position and the deployed position by a blocker door actuator, the thrust reversal arrangement being configured so that, when deployed, the at least one blocker door directs the air outboard and forward through the nacelle.

5. The nacelle according to claim 1, wherein the aft cowling is moveable between a forward stowed position and a rearward deployed position.

6. The nacelle according to claim 5, wherein the at least one circumferential turning vane is mounted to the aft cowling such that the circumferential turning vane and the aft cowling move together when moving between the deployed position and the stowed position.

7. The nacelle according to claim 1, wherein the at least one circumferential turning vane of the thrust reversal arrangement includes a first circumferential turning vane provided at a first location and a second circumferential turning vane provided at a second location, the first circumferential turning vane being configured to direct air in a first circumferential direction and the second circumferential turning vane being configured to direct air in a second circumferential direction, such that, in use, a roll torque force generated by the first and second circumferential turning vanes substantially cancel one another.

8. The nacelle according to claim 1, wherein the at least one circumferential turning vane is mounted to the at least first and the at least second circumferentially spaced fixed thrust reverser cascade boxes by a pin slidably mounted to an axially extending rail.

9. The nacelle according to claim 8, wherein the axially extending rail is located between the at least first and the at least second circumferentially spaced fixed thrust reverser cascade boxes.

10. The nacelle according to claim 8, wherein the at least first and the at least second circumferentially spaced fixed thrust reverser cascade boxes each includes at least one hook that extends partially around the axially extending rail when installed, and the at least one hook is configured to react any hoop loads generated by the at least first and the at least second circumferentially spaced fixed thrust reverser cascade boxes under reverse thrust operation.

11. The nacelle according to claim 1, wherein the at least first and the at least second circumferentially spaced fixed thrust reverser cascade boxes are each mounted to at least one of a reverse actuator, an upper hinge beam, and a lower latch beam.

12. An aircraft comprising the gas turbine engine having the nacelle in accordance with claim 1.

* * * * *